United States Patent
Shi et al.

(10) Patent No.: US 8,988,370 B2
(45) Date of Patent: *Mar. 24, 2015

(54) LIQUID CRYSTAL PANEL AND LIQUID CRYSTAL DISPLAY DEVICE

(75) Inventors: Xuanming Shi, Shenzhen (CN); Fuyou Li, Shenzhen (CN); Jiangli Wei, Shenzhen (CN)

(73) Assignee: Taiguen Technology (Shen_Zhen) Co., Ltd., Guangdong (CN)

( * ) Notice: Subject to any disclaimer, the term of this patent is extended or adjusted under 35 U.S.C. 154(b) by 323 days.

This patent is subject to a terminal disclaimer.

(21) Appl. No.: 13/329,201

(22) Filed: Dec. 16, 2011

(65) Prior Publication Data

US 2012/0086661 A1   Apr. 12, 2012

Related U.S. Application Data

(63) Continuation of application No. PCT/CN2010/073755, filed on Jun. 10, 2010.

(30) Foreign Application Priority Data

Jun. 19, 2009  (CN) .......................... 2009 1 0087390

(51) Int. Cl.
*G06F 3/041* (2006.01)
*G02F 1/1335* (2006.01)
(Continued)

(52) U.S. Cl.
CPC ............. *G06F 3/046* (2013.01); *G06F 3/0412* (2013.01); *G06F 3/044* (2013.01); *G06F 3/045* (2013.01); *G02F 1/13338* (2013.01); *G02F 1/134309* (2013.01); *G06F 2203/04106* (2013.01)
USPC ............................................. 345/173; 349/96

(58) Field of Classification Search
None
See application file for complete search history.

(56) References Cited

U.S. PATENT DOCUMENTS

| 8,525,941 | B2 * | 9/2013 | Shi et al. .......................... 349/12 |
| 2004/0104899 | A1 | 6/2004 | Hong et al. .................... 345/173 |
| 2004/0105040 | A1 | 6/2004 | Oh et al. .......................... 349/12 |

FOREIGN PATENT DOCUMENTS

| CN | 1410875 A | 4/2003 |
| CN | 1501315 A | 6/2004 |

(Continued)

OTHER PUBLICATIONS

International Search Report of International Application No. PCT/CN2010/073755, dated Sep. 23, 2010.

(Continued)

*Primary Examiner* — Amr Awad
*Assistant Examiner* — Andre Matthews
(74) *Attorney, Agent, or Firm* — J. C. Patents

(57) ABSTRACT

A liquid crystal panel comprises a first substrate (11) and a second substrate (21) facing each other. A polarizer (30) is adhered to one side of the first substrate (11) orientated away from the second substrate (21). The liquid crystal panel further comprises a touch type input structure which is adhered on the outer surface of the polarizer (30) orientated away from the first substrate (11) to identify a touch signal; and an electromagnetic type antenna array at least comprising a first-direction conductive wire (51) and a second-direction conductive wire (52). The first-direction conductive wire (51) and the second-direction conductive wire (52) are respectively made of conductive material, and are formed on any one film between the first substrate (11) and the second substrate (21). The antenna array is used to identify an electromagnetic signal.

17 Claims, 7 Drawing Sheets

(51) Int. Cl.
*G06F 3/046* (2006.01)
*G06F 3/044* (2006.01)
*G06F 3/045* (2006.01)
G02F 1/1333 (2006.01)
G02F 1/1343 (2006.01)

(56) References Cited

FOREIGN PATENT DOCUMENTS

| | | | |
|---|---|---|---|
| CN | 1501317 | A | 6/2004 |
| CN | 1534333 | A | 10/2004 |
| JP | 61-237120 | A | 10/1986 |
| JP | 2000-172447 | A | 6/2000 |
| JP | 2002-214586 | A | 7/2002 |
| JP | 2004-302431 | A | 10/2004 |
| JP | 2004-326419 | A | 11/2004 |
| JP | 2006-202006 | A | 8/2006 |
| JP | 2006-243428 | A | 9/2006 |
| JP | 2008-84222 | A | 4/2008 |
| JP | 2009-99141 | A | 5/2009 |
| JP | 5530515 | | 6/2014 |

OTHER PUBLICATIONS

Japanese Examination Report of corresponding Japan Application No. 2012-515341, dated Jul. 30, 2013.

* cited by examiner

LIQUID CRYSTAL PANEL AND LIQUID CRYSTAL DISPLAY DEVICE

CROSS-REFERENCE TO RELATED APPLICATIONS

This application is a continuation of International Application No. PCT/CN2010/073755 filed on Jun. 10, 2010, which claims the priority benefit of Chinese Patent Application No. 200910087390.X, filed on Jun. 19, 2009. The contents of the above identified applications are incorporated herein by reference in their entirety.

FIELD OF THE TECHNOLOGY

The present invention relates to a handwritten input technique, particularly to a liquid crystal (LC) panel with a handwritten input function and a liquid crystal display (LCD) device.

BACKGROUND

With the development of an input technique and a display technique, the combination of a common LCD device and a handwriting input device is a development trend meeting the market requirements.

In the prior art, the technical solutions which facilitate the LCD device to have a handwriting input function have the following forms. Firstly, according to realization principles, the handwriting input can be divided into a resistance type, a capacitance type and an electromagnetic induction type. The resistance type handwriting input device and the capacitance type handwriting input device can receive input signals by identifying touch actions. Generally, an independent resistance type handwriting input board or an independent capacitance type handwriting input board is assembled on the front side of the LCD device, i.e., on the side of the LCD device orientated towards the viewer, so as to receive the touch input actions. An electromagnetic induction type handwriting board identifies an input position through receiving an electromagnetic signal of an electromagnetic induction pen. Generally, the electromagnetic induction type handwriting board is also assembled on the front side of or the back side of the LCD device as one independent device, for example, it is assembled on the back side of a backlight module.

The above technical solutions for realizing the handwriting input function of the LCD device have the following defects. The thickness of the LCD device is increased due to the handwriting input board being as one independent device, which does not conform to the light and thin development trend of the LCD device. When assembled, the handwriting input board and the LCD device have the problems of unstable and unreliable assembly, thus causing input accuracy to be decreased.

SUMMARY

It is an object of the present invention to provide a liquid crystal panel and a liquid crystal display device, so as to improve the accuracy and the reliability of LCD device handwriting input, and meet the light and thin development requirements of the LCD device.

One aspect of the present invention provides a liquid crystal (LC) panel, comprising a first substrate and a second substrate facing each other, and a liquid crystal layer filled between the first substrate and the second substrate; the first substrate and the second substrate respectively comprise a first base substrate and a second base substrate as well as multi-film structures respectively formed on the first base substrate and the second base substrate, and one side of the first substrate orientated away from the second substrate is adhered with a polarizer, wherein the LC panel further comprises:

a touch type input structure which is adhered on an outer surface of the polarizer orientated away from the first substrate to identify a touch signal; and an electromagnetic type antenna array which comprises a first-direction conductive wire and a second-direction conductive wire, wherein the first-direction conductive wire and the second-direction conductive wire are respectively made of conductive material, formed on any one film between the first base substrate and the second base substrate, insulated from conductive material in the multi-film structures and used for identifying an electromagnetic signal.

Another aspect of the present invention also provides a liquid crystal display (LCD) device adopting the LC panel of the present invention, and the LCD device further comprises a frame and a controller outside or inside of the frame, wherein the LC panel is embedded in the frame; the touch type input structure and the electromagnetic type antenna array are connected with the controller to transmit the touch signal and the electromagnetic signal to the controller, and the touch signal and the electromagnetic signal are identified by the controller.

With the abovementioned technical solutions, the antenna array is integrated in the LC panel and the touch type input structure is integrated on the polarizer in the present invention, thereby facilitating the LCD device to simultaneously have an electromagnetic induction identification handwriting input function and an identification touch input function. Furthermore, as the antenna array is integrated in the LC panel and the touch type input structure is integrated on the polarizer, the thickness of the LCD device is hardly increased, thereby meeting the light and thin requirements of the LCD device and reducing the assembly cost. The antenna array, the touch type input structure and the LC panel are tightly combined with one another, so that the error caused by the assembly can be further avoided, thus the identification accuracy and reliability can be increased.

DETAILED DESCRIPTION

Figure 1:
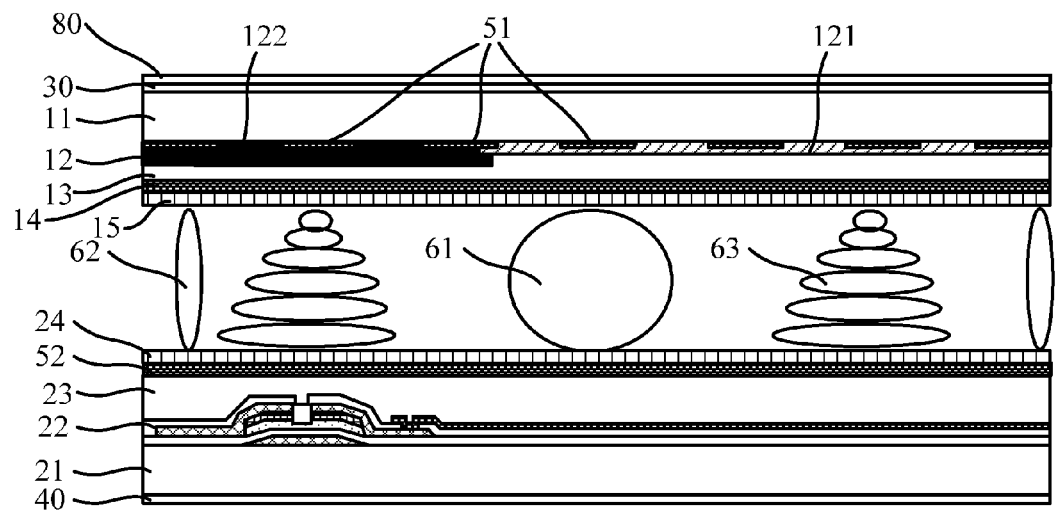
FIG. 1 is a local cross-sectional structural schematic diagram of an LC panel provided by Example 1 of the present invention.

An LC panel provided in the present invention comprises a first substrate and a second substrate facing each other. A liquid crystal layer is filled between the first substrate and the second substrate. The first substrate comprises a first base substrate and a multi-film structure formed on the first base substrate; the second substrate comprises a second base substrate and a multi-film structure formed on the second base substrate; and one side of the first substrate orientated away from the second substrate is adhered with a polarizer. Generally, the first substrate is a color-film substrate, and the second substrate is an array substrate. Furthermore, the LC panel further comprises a touch type input structure and an electromagnetic type antenna array. The touch type input structure is adhered on the outer surface of the polarizer orientated away from the first substrate to identify a touch signal; and the electromagnetic type antenna array at least comprises a first-direction conductive wire and a second-direction conductive wire, wherein the first-direction conductive wire and the second-direction conductive wire are respectively made of conductive material, preferably made of transparent conductive material, formed on any one film between the first base substrate and the second base substrate, and insulated from the conductive material in the multi-film layer structures to identify an electromagnetic signal.

The electromagnetic type antenna array completes the handwritten input based on the electromagnetic induction principle with the cooperation between an antenna array and an electromagnetic induction pen. The antenna array includes a plurality of U-shaped coils which are perpendicular to each other. When the electromagnetic induction pen transmits electromagnetic signals, the antenna array can receive the electromagnetic signals and identify the frequency and the amplitude of the electromagnetic signals as well as the position of the electromagnetic induction pen, thus realizing the handwriting input.

The touch type input structure can divided into a resistance type touch screen structure or a capacitance type touch screen structure and has various realization ways.

The base substrates of the color-film substrate and the array substrate are generally made of the glass, the patterns of the multi-film structures formed on the base substrates have various design modes, and the formation position of the antenna array also has various modes.

A typical antenna array comprises a first-direction conductive wire and a second-direction conductive wire. The first-direction conductive wire is insulated from the second-direction conductive wire and they are insulated from the conductive material in the LC panel to avoid a short circuit with an operating circuit in the LC panel. Based on the insulation requirement, the antenna array can have various forming modes in the LC panel.

Among the abovementioned, one forming mode is as follows: a first-direction conductive wire and a second-direction conductive wire which are included in the antenna array are respectively formed at different positions between the base substrate and a film which are made of insulating material and adjacent to each other or between two films which are made of insulating material and adjacent to each other in the LC panel. No additional insulating layer is needed for this technical solution.

Another forming mode is as follows: a first-direction conductive wire and a second-direction conductive wire which are included in the antenna array are formed at a same position between the base substrate and a film which are made of insulating material and adjacent to each other or between two films which are made of insulating material and adjacent to each other in the LC panel, and an inner interval insulating layer is formed between the first-direction conductive wire and the second-direction conductive wire. In this technical solution, the first-direction conductive wire and the second-direction conductive wire are formed at the same position, and are insulated from each other by the inner interval insulating layer.

Another forming mode is as follows: a first-direction conductive wire and/or a second-direction conductive wire which are included in the antenna array are/is adjacent to a film of the conductive material in the LC panel, and an outer interval insulating layer is formed between the first-direction conductive wire and/or the second-direction conductive wire and the adjacent film of the conductive material. In this technical solution, the first-direction conductive wire and the second-direction conductive wire are provided at a same position or at different positions, and they can be formed at any positions. The antenna array and the conductive material in the LC panel are insulated from each other by the outer interval insulating layer.

The present invention is further described in detail through embodiments and with the combination of drawings as follows. The following examples are described in the case that the first substrate of the LC panel is the color-film substrate and the second substrate is the array substrate.

Example 1

FIG. 1 is a local cross-sectional structural schematic diagram of an LC panel provided by Example 1 of the present invention. A plane of the LC panel is generally divided into a plurality of pixel units. This example is described with a typical thin-film transistor LCD device. The structure of one pixel unit in the LC panel is shown in FIG. 1.

A typical multi-film structure on the color-film substrate, starting from one side of a first base substrate 11 orientated towards a liquid crystal layer, comprises a color resin and black matrix layer 12, a first protection layer 13, a common electrode layer 14 and a first alignment film 15 in sequence. The color resin and black matrix layer 12 comprises color-film resins 121 and a black matrix 122 which is provided between the color-film resins 121 at interval. The first protection layer 13 is generally made of organic insulating material, and it can protect and planarize the color resin and black matrix layer 12. The common electrode layer 14 is made of transparent conductive material and provides a common voltage for liquid crystal molecules 63. The first alignment film 15 is generally made of the insulating material and formed with alignment grooves thereon adjacently to the liquid crystal layer to define the direction of the adjacent liquid crystal molecules 63.

A typical multi-film structure on the array substrate, starting from one side of a second base substrate 21 orientated towards the liquid crystal layer, comprises a thin-film transistor driving array film 22, a second protection layer 23 and a second alignment film 24 in sequence. The thin-film transistor driving array film 22 consists of a plurality of film patterns, which generally comprise a gate electrode, a gate scanning line, a gate insulating layer, an active layer, a source electrode, a drain electrode, a passivation layer, a pixel electrode, etc. The thin-film transistor driving array film 22 is covered with the second protection layer 23. Similar to the first protection layer 13, the second protection layer 23 is also made of the organic insulating material and can protect and planarize the thin-film transistor driving array film 22. The second alignment film 24 is formed on the second protection layer 23. The direction of the adjacent liquid crystal molecules 63 is defined by alignment grooves on the second alignment film 24.

After manufactured respectively, the color-film substrate and the array substrate are assembled together, wherein these two substrates are supported with a spacer 61 between them and sealed with frame sealant 62 at the periphery thereof, and then the liquid crystal molecules 63 are filled.

Based on an imaging principle of the LCD device, the LC panel generally also comprises an upper polarizer 30 and a lower polarizer 40 respectively on an upper side and a lower side thereof, and they operate with the liquid crystal molecules 63 which make the light twist such that different images are displayed. A touch type input structure 80 can be integrated on the upper polarizer 30.

An antenna array provided in the LC panel is made of the conductive material, and preferably is made of transparent conductive material. Specifically, the material is the same with the material adopted by the pixel electrode and the common electrode layer, for example, Indium Tin Oxides (ITO), etc. In this example, the antenna array comprises a first-direction conductive wire 51 and a second-direction conductive wire 52 which are perpendicular to each other. The first-direction conductive wire 51 and the second-direction conductive wire 52 respectively include a plurality of U-shaped coils which have the same direction, and these U-shaped coils are arranged on the whole surface of the base substrate or films. The distance between the central points of two adjacent U-shaped coils is in the range of about 6.5 mm to about 7 mm. The first-direction conductive wire 51 and the second-direction conductive wire 52 are respectively formed at different positions between the base substrate and a film which are made of insulating material and adjacent to each other or between two films which are made of insulating material and adjacent to each other in the LC panel.

Specifically, one of the first-direction conductive wire 51 and the second-direction conductive wire 52 is formed on a surface of the first base substrate 11 orientated towards the inner side of the LC panel, and the other one is formed on a surface of the second protection layer 23 orientated towards the inner side of the LC panel. For example, the first-direction conductive wire 51 may be formed on the first base substrate 11 which is adjacent to the color resin and black matrix layer 12 made of insulating material. The second-direction conductive wire 52 is formed on the second protection layer 23 which is adjacent to the second alignment film 24 made of the insulating material.

The color resin and black matrix layer as well as the first protection layer are all the films made of the insulating material. That is, the first-direction conductive wire or the second-direction conductive wire may be respectively formed at any two positions of the following positions:

a position between the first base substrate and the color resin and black matrix layer;

a position between the color resin and black matrix layer and the first protection layer; and a position between the second protection layer and the second alignment film.

With the adoption of the abovementioned technical solution, the first-direction conductive wire and the second-direction conductive wire are formed on the base of the existing LC panel by directly using the transparent conductive material. And no additional insulation film is needed. At the same time, the first-direction conductive wire and the second-direction conductive wire both can be formed on a flat film to meet the requirement of the antenna array to identify an electromagnetic signal.

With the adoption of the technical solution in the present example, based on the existing LC panel, the touch type input structure and the conductive wires in the antenna array can be integrated in the LC panel. On the one hand, an independent handwriting input board, such as a PCB, is not needed to be assembled at the outside of the LCD device, thereby meeting the light and thin requirements of the LCD device, saving manufacturing and assembly costs at the same time, and avoiding the defect that the LC panel is easily damaged during the assembly of the independent handwriting input board. On the other hand, the antenna array and the LC panel are combined tightly, thus increasing the accuracy and the reliability of identifying the positions of electromagnetic signals. Furthermore, the input modes of the user can be enriched since the LC panel has the functions of identifying the touch signal and the electromagnetic signal simultaneously.

Example 2

In Example 2 of the present invention, the structure of the LC panel is substantially the same with that of Example 1. An antenna array of Example 2 comprises a first-direction conductive wire and a second-direction conductive wire which are perpendicular to each other. The difference of the Example 2 from Example 1 is as follows: insulating transparent films are covered on the first-direction conductive wire and the second-direction conductive wire. That is, when the first-direction conductive wire and the second-direction conductive wire are formed in the LC panel, the insulating transparent films can be respectively provided at two sides of the first-direction conductive wire and the second-direction conductive wire, thus guaranteeing that the first-direction conductive wire and the second-direction conductive wire are insulated from the LC panel.

In the present example, if an inner interval insulation lay 53 is formed between the first-direction conductive wire 51 and the second-direction conductive wire 52, insulation is firstly maintained between the first-direction conductive wire 51 and the second-direction conductive wire 52.

Figure 2:
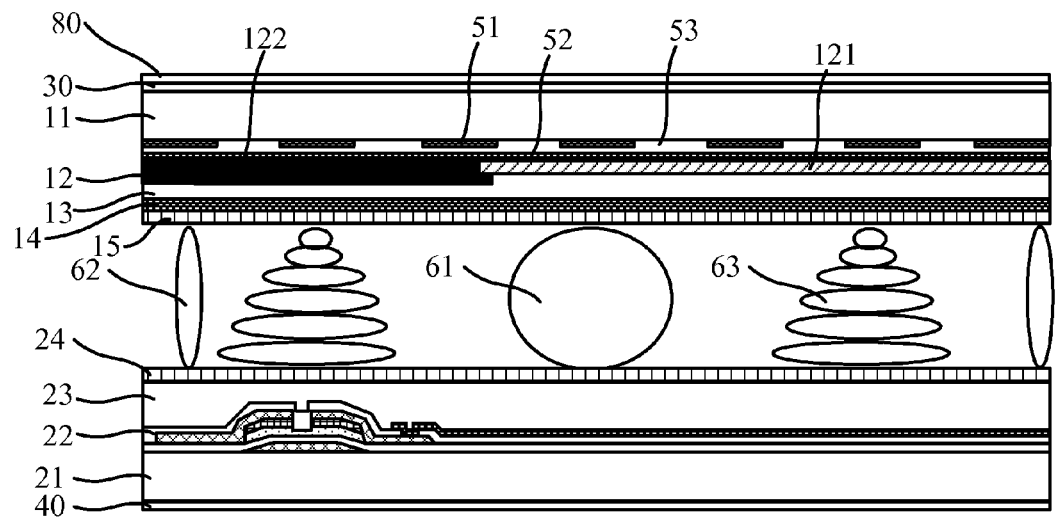
FIG. 2 is a cross-sectional structural schematic diagram of a first embodiment of an LC panel provided by Example 2 of the present invention.
Figure 3:
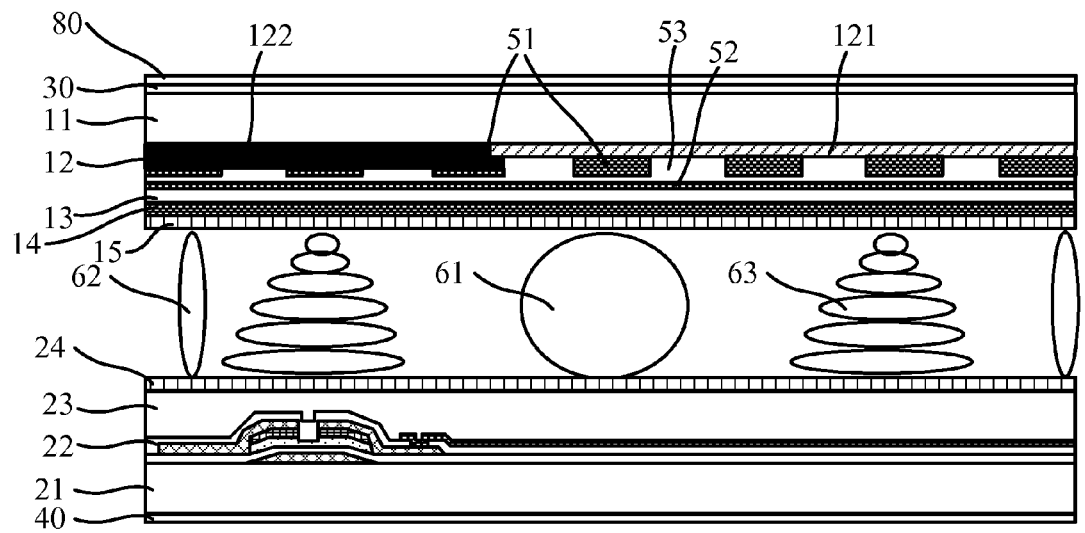
FIG. 3 is a cross-sectional structural schematic diagram of a second embodiment of an LC panel provided by Example 2 of the present invention.
Figure 4:
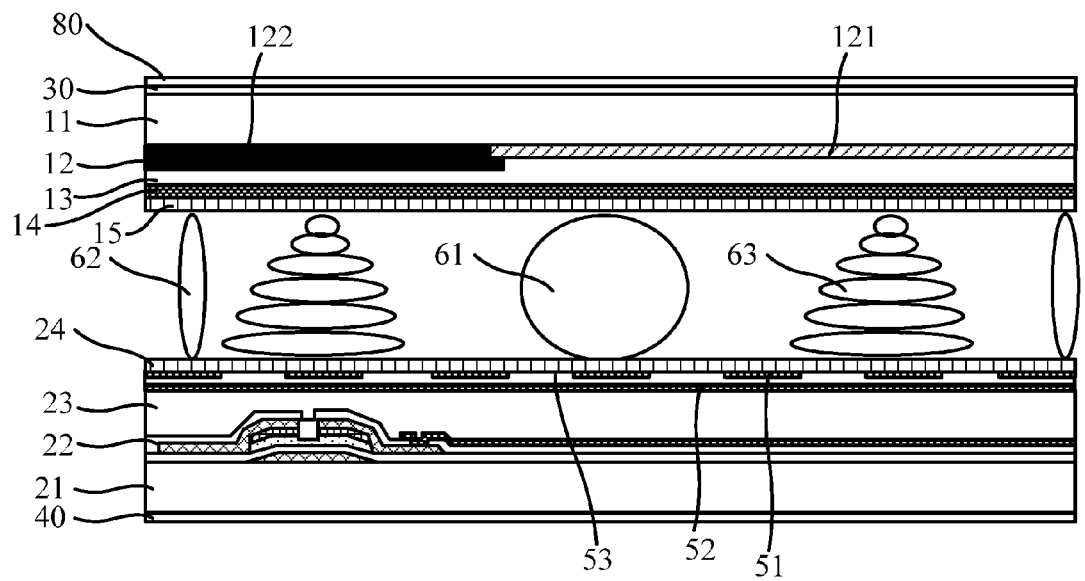
FIG. 4 is a cross-sectional structural schematic diagram of a third embodiment of an LC panel provided by Example 2 of the present invention.

The antenna array and the inner interval insulating layer 53 may have a plurality of positions to be formed, specially they are formed at a same position between the base substrate and a film which are made of the insulating material and adjacent to each other or between two films which are made of the insulating material and adjacent to each other. FIGS. 2-4 are cross-sectional structural schematic diagrams of respective embodiments of an LC panel provided in Example 2 of the present invention, which are described with the color-film substrate and the array substrate having the structure in Example 1.

As shown in FIG. 2, the first-direction conductive wire 51, the inner interval insulating layer 53 and the second-direction conductive wire 52 may be formed between the first base substrate 11 and the color resin and black matrix layer 12.

Or, as shown in FIG. 3, the first-direction conductive wire 51, the inner interval insulating layer 53 and the second-direction conductive wire 52 may be formed between the color resin and black matrix layer 12 and the first protection layer 13.

Or, as shown in FIG. 4, the first-direction conductive wire 51, the inner interval insulating layer 53 and the second-direction conductive wire 52 may be formed between the second protection layer 23 and the second alignment film 24.

Example 3

In Example 3 of the present invention, the structure of the LC panel is substantially the same with that of Example 1. An antenna array of Example 3 comprises a first-direction conductive wire and a second-direction conductive wire which are perpendicular to each other. The difference of the Example 3 from Example 1 is as follows: an outer interval insulating layer is covered on the first-direction conductive wire and/or the second-direction conductive wire, thus guaranteeing that the first-direction conductive wire and the second-direction conductive wire are insulated from the conductive material of the LC panel.

In the abovementioned technical solution, the first-direction conductive wire and the second-direction conductive wire may be provided at any position between the two base substrates of the LC panel. They can be provided at a same position and maintained insulation by the inner interval insulating layer; or they can be provided at different positions. The present example is still described with the typical color-film substrate and array substrate of the abovementioned Examples. FIGS. 5-8 are cross-sectional structural schematic diagrams of respective embodiments of an LC panel provided in Example 3 of the present invention.

Figure 5:
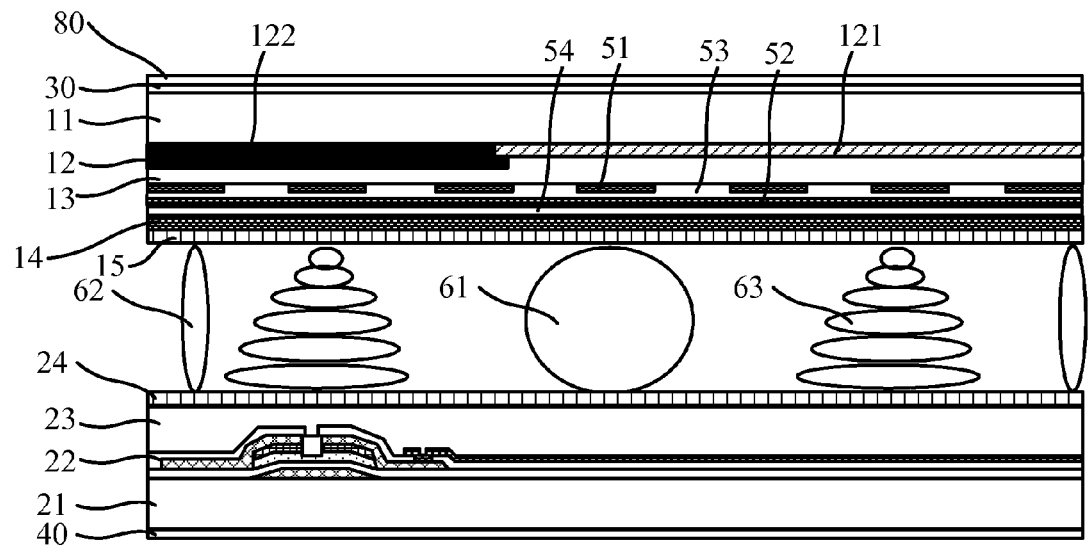
FIG. 5 is a cross-sectional structural schematic diagram of a first embodiment of an LC panel provided by Example 3 of the present invention.

As shown in FIG. 5, the first-direction conductive wire 51, the inner interval insulating layer 53, the second-direction conductive wire 52 and an outer interval insulating layer 54 may be formed between the first protection layer 13 and the common electrode layer 14, so that the insulation between the second-direction conductive wire 52 and the common electrode layer 14 is maintained through the outer interval insulating layer 54.

Figure 6:
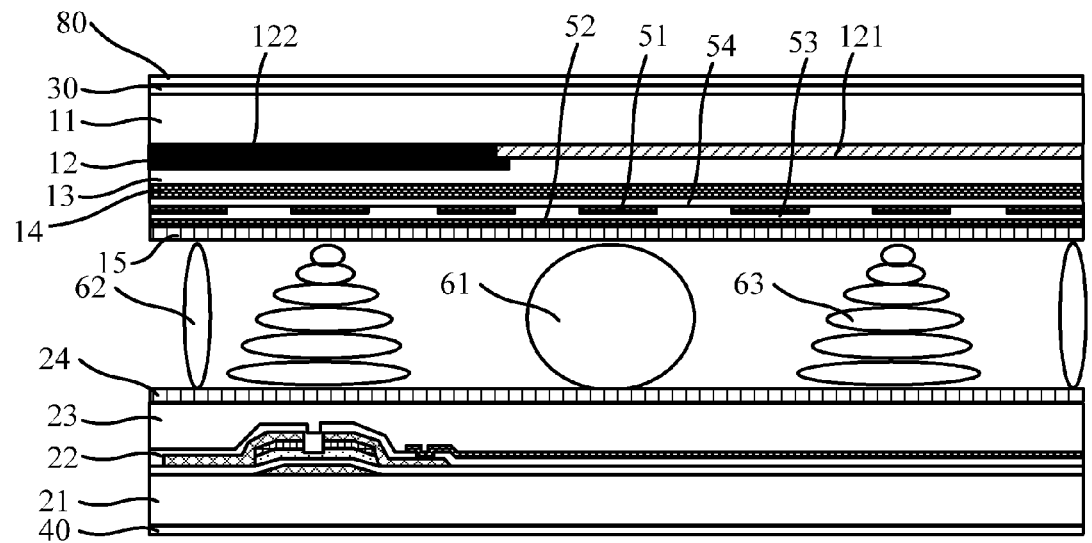
FIG. 6 is a cross-sectional structural schematic diagram of a second embodiment of an LC panel provided by Example 3 of the present invention.

Or, as shown in FIG. 6, the first-direction conductive wire 51, the inner interval insulating layer 53, the second-direction conductive wire 52 and the outer interval insulating layer 54 may be formed between the common electrode layer 14 and the first alignment film 15, so that the insulation between the first-direction conductive wire 51 and the common electrode layer 14 is maintained through the outer interval insulating layer 54.

Figure 7:
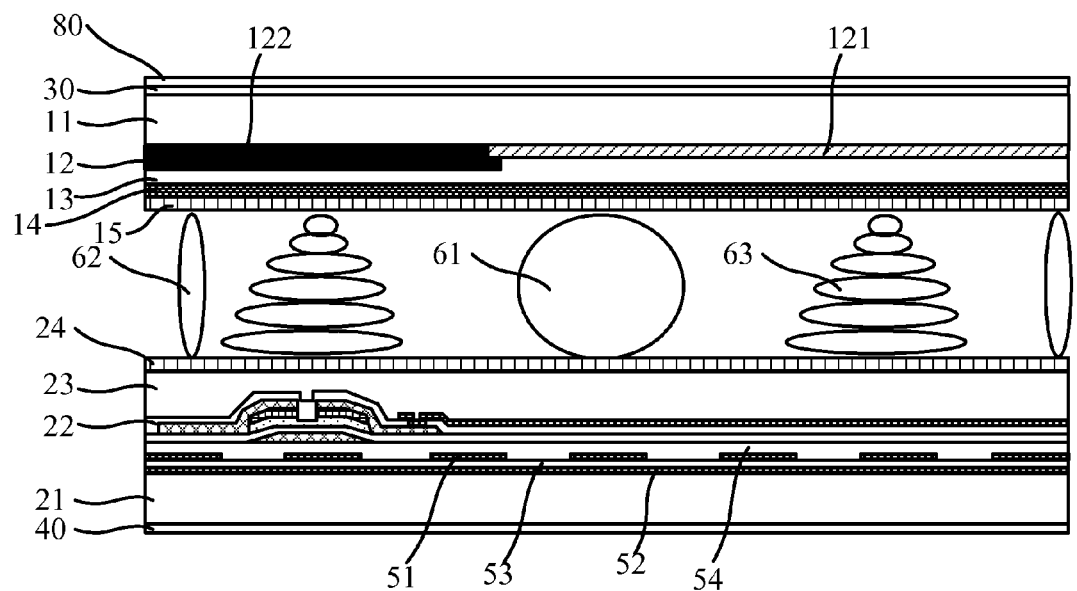
FIG. 7 is a cross-sectional structural schematic diagram of a third embodiment of an LC panel provided by Example 3 of the present invention.

Or, as shown in FIG. 7, the first-direction conductive wire 51, the inner interval insulating layer 53, the second-direction conductive wire 52 and the outer interval insulating layer 54 may be formed between the second base substrate 21 and the thin-film transistor driving array film 22, or may also be formed between any two films in the thin-film transistor driving array film 22, so that the insulation is maintained through the outer interval insulating layer 54.

Figure 8:
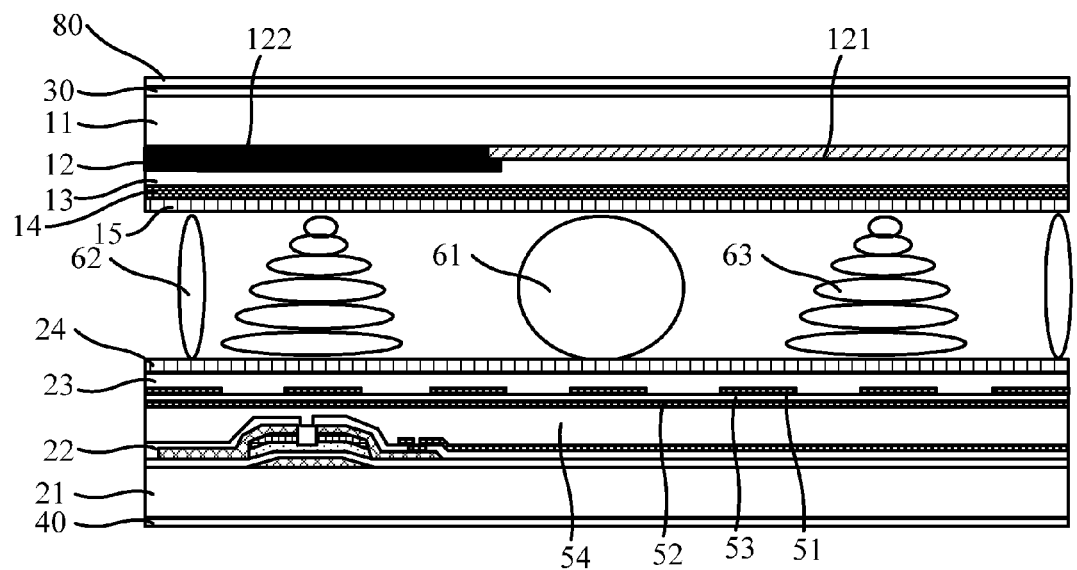
FIG. 8 is a cross-sectional structural schematic diagram of a forth embodiment of an LC panel provided by Example 3 of the present invention.

Or, as shown in FIG. 8, the first-direction conductive wire 51, the inner interval insulating layer 53, the second-direction conductive wire 52 and the outer interval insulating layer 54 may be formed between the thin-film transistor driving array film 22 and the second protection layer 23, so that the insulation between the second-direction conductive wire 52 and the thin-film transistor driving array film 22 is maintained through the outer interval insulating layer 54.

In the abovementioned technical solution, the insulation between the first-direction conductive wire 51, the second-direction conductive wire 52 and the conductive films is realized by additionally providing the outer interval insulating layer 54.

Or, the first-direction conductive wire and the second-direction conductive wire may be wrapped up with the outer interval insulating layer to form the insulating conductive wires and realize insulation, for example, the U-shaped coils are the enameled wires.

In the present example, the first-direction conductive wire and the second-direction conductive wire are not limited to be disposed at a same position, and they also can be provided at different positions, namely, they can be provided respectively at the different positions between these films and maintain insulation through one or more outer interval insulating layers.

In the technical solution in the present example, by the way of isolating the conductive wires in the antenna array and the conductive material in the LC panel through the outer interval insulating layer, the antenna array is integrated in the LC panel so as to meet the light and thin requirements of the LCD device, save manufacturing and assembly costs, facilitate the antenna array and the LC panel to be tightly combined, and improve the accuracy and reliability of identifying the electromagnetic signal positions.

In the abovementioned Example 2 and Example 3, the antenna array comprises the first-direction conductive wire and the second-direction conductive wire which are perpendicular to each other. Furthermore, the first-direction conductive wire and the second-direction conductive wire may be wrapped up or covered with the insulating transparent film. The first-direction conductive wire and the second-direction conductive wire also can be respectively formed on two surfaces of any one film in the multi-film structures on the color-film substrate and on the array substrate, or formed between the surfaces of any two films as long as the insulation between the conductive wires as well as the insulation between the conductive wires and the conductive films of the LC panel are guaranteed and they can be normally operated. In applications, the electromagnetic signals triggered by the electromagnetic induction pen may avoid the interference of the variable electric field in the LC panel by regulating the frequency, the amplitude and other parameters of electromagnetic signals. Furthermore, the first-direction conductive wire and the second-direction conductive wire may be formed by depositing and etching a transparent conductive film. Alternatively, the first-direction conductive wire and the second-direction conductive wire may be formed by embedding a transparent conductive film into an insulating film by a thermal melting or thermal pressing process.

In the technical solution of the LC panel of the present invention, according to the resolution requirement of the antenna array, if the conductive wires of the antenna array can be correspondingly provided in the area of the black matrix, the antenna array can be made of any conductive materials and not be limited to the transparent conductive material. The transmission light of the LC panel is not be influenced obviously by the antenna array hidden within the area of the black matrix.

In addition, the antenna array of the above examples of the present invention includes two layers of wires consisting of the first-direction conductive wire and the second-direction conductive wire, but the present invention is not limited to this. The antenna array of the present invention may be one layer of wire, for example, one layer of wire formed by interweaving the U-shaped coils of the first-direction conductive wire and the U-shaped coils of the second-direction conductive wire. In this case, the U-shaped coils are insulated with each other at the crossing points. Or, the antenna array of the present invention may include two or more layers of wires. For example, when the distance between the U-shaped coils of the first-direction conductive wire 51 is too long, with a result of a reduced resolution, two layers of first-direction conductive wires may be disposed to increase the accuracy of detection.

Example 4

Figure 9:
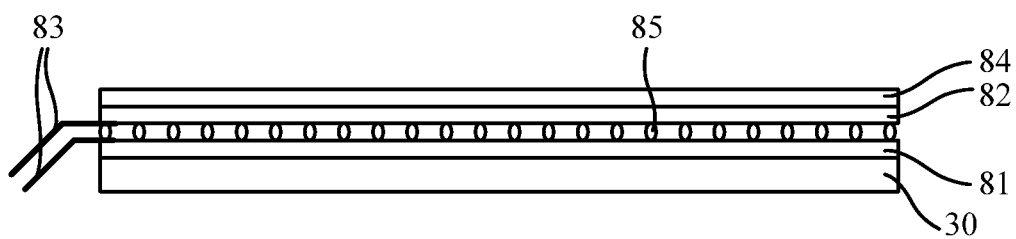
FIG. 9 is a cross-sectional schematic diagram of a touch screen structure in an LC panel provided by Example 4 of the present invention.

FIG. 9 is a cross-sectional schematic diagram of a touch screen in an LC panel provided by Example 4 of the present invention. On the basis of the above examples, the touch type input structure of the present example is a resistance type touch screen structure which specifically comprises a first conductive layer 81, a second conductive layer 82 and a plurality of detection wires 83. The first conductive layer 81 is made of a transparent conductive material such as ITO and formed on an upper polarizer 30 on one side of the color-film substrate, for example, by bonding or welding mode. The second conductive layer 82 is made of a transparent conductive material and formed on a transparent elastic substrate 84, and the second conductive layer 82 is faced to the first conductive layer 81. A plurality of supports 85, such as a spherical particle, are formed between the first conductive layer 81 and the second conductive layer 82, so that a certain distance can be maintained between the first conductive layer 81 and the second conductive layer 82, and the first conductive layer 81 can be contacted with the second conductive layer 82 when the second conductive layer 82 is pressed and deformed. A plurality of detection wires 83 are respectively connected with the first conductive layer 81 and the second conductive layer 82 to input a bias voltage and receive a detection voltage value which changes according to the touch signal, i.e., a touch pressure. The resistance type touch screen structure can have various types, such as four-wire type, five-wire type, six-wire type, seven-wire type, eight-wire type, etc.

Figure 10:
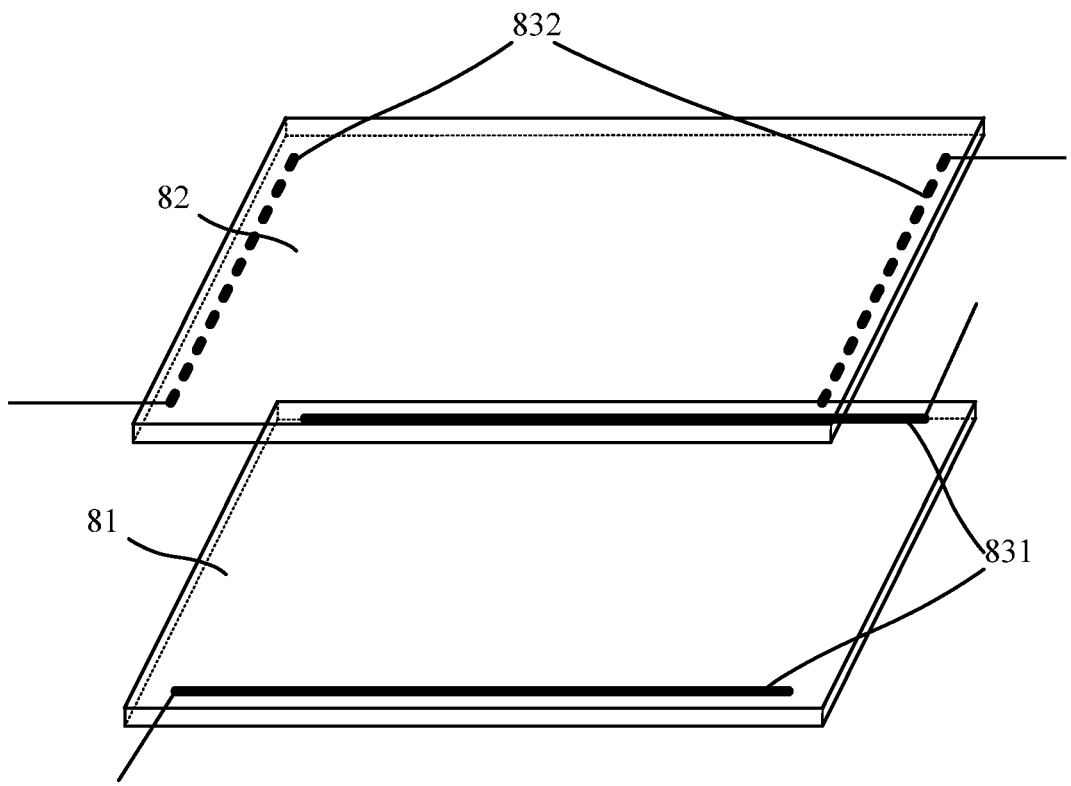
FIG. 10 is a schematic diagram of a four-wire resistance type touch screen structure in the LC panel provided by Example 4 of the present invention.

FIG. 10 is a schematic diagram of a four-wire resistance type touch screen structure in an LC panel provided by Example 4 of the present invention. In the four-wire resistance type touch screen structure, the detection wires comprise two first-direction conductive bars 831 and two second-direction conductive bars 832; the first-direction conductive bars 831 are arranged on the first conductive layer 81 and are respectively adjacent to two side edges of the first conductive layer 81; the two second-direction conductive bars 832 are arranged on the second conductive layer 82 and are respectively adjacent to two side edges of the second conductive layer 82 and perpendicular to the first-direction conductive bars 831; and the first-direction conductive bars 831 and the second-direction conductive bars 832 are used for alternately inputting the bias voltage and alternately receiving the detection voltage value. For example, the two first-direction conductive bars 831 can be respectively used for inputting a high voltage value and a low voltage value as the bias voltages. When the first conductive layer 81 touches the second conductive layer 82, the high voltage value and the low voltage value of the first conductive layer 81 are divided, and the second conductive bars 832 can receive a voltage dividing value, i.e., the detection voltage value. The resistance value of the first conductive layer 81 is in proportion to the distance, so that a position of a touch point in a first direction can be calculated according to the detection voltage value. After that, the high voltage value and the low voltage value are in turn input to the second-direction conductive bars 832 respectively, and similarly the position of the touch point in a second direction can be calculated so as to calculate the coordinate of the touch point.

The eight-wire resistance type touch screen structure differs from the four-wire type in that it comprises four first-direction conductive bars and four second-direction conductive bars, which are respectively adjacent to the four side edges of the first conductive layer and the second conductive layer.

Figure 11:
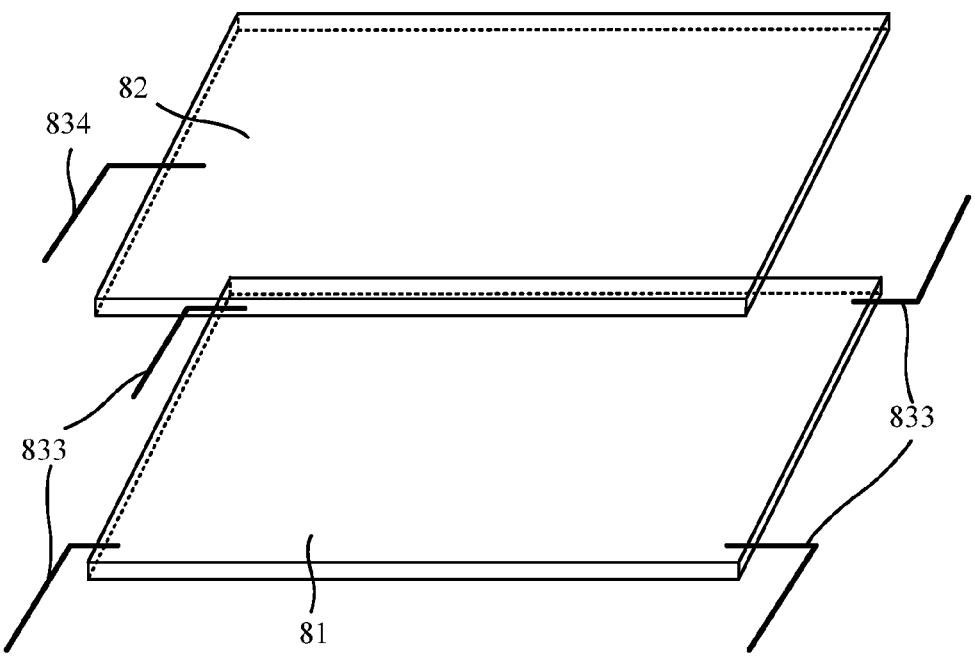
FIG. 11 is a schematic diagram of a five-wire resistance type touch screen structure in the LC panel provided by Example 4 of the present invention.

FIG. 11 is a schematic diagram of a five-wire resistance type touch screen structure in an LC panel provided by Example 4 of the present invention. In the five-wire resistance type touch screen structure, the detection wires comprise a voltage detection wire 834 and four voltage input wires 833, wherein the voltage input wires 833 are connected with the first conductive layer 81 and are respectively adjacent to four corners of the first conductive layer 81, and the voltage detection wire 834 is connected with the second conductive layer 82. The voltage input wires 833 are used for alternately inputting the bias voltage; and the voltage detection wire 834 is used for receiving the detection voltage value. The realization principle comprises the steps of firstly inputting a high voltage value at a top left corner and a bottom left corner, and inputting a low voltage value at a top right corner and a bottom right corner, and similarly to the above dividing voltage principle, calculating the position of the touch point in the first direction according to the detection voltage value received from the second conductive layer 82 during touching. After that, a high voltage value is input at the top left corner and the top right corner, and a low voltage value is input at the bottom left corner and the bottom right corner, so that the position of the touch point in the second direction can be calculated.

The seven-wire resistance type touch screen structure differs from the five-wire type in that it comprises six voltage input wires which are respectively connected with the across corners of the first conductive layer. Referring to the operation mode of the five-wire type, the input voltage values at one pair of across corners are alternately changed, namely, the voltage input wires are additionally disposed at this pair of across corners, so that no circuit switching is needed.

Example 5

Figure 12:
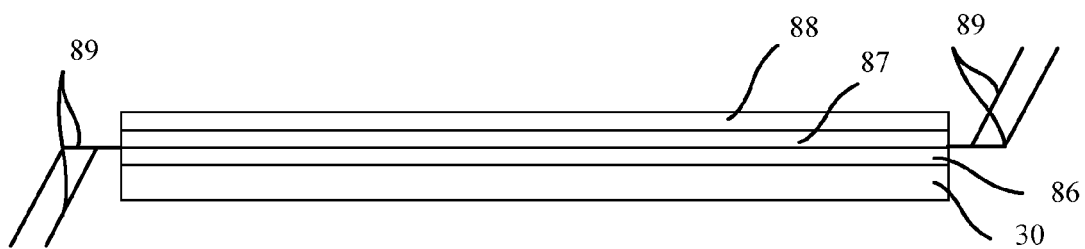
FIG. 12 is a cross-sectional schematic diagram of a touch screen structure in an LC panel provided by Example 5 of the present invention.

FIG. 12 is a cross-sectional schematic diagram of a touch screen structure in an LC panel provided by Example 5 of the present invention. On the basis of the above examples, the touch type input structure is a capacitance type touch screen structure and specifically comprises a first work layer 86, an isolation layer 87 and a second work layer 88. The first work layer 86 is made of a transparent conductive material such as ITO and formed on the upper polarizer 30, for example, by bonding or welding mode. The first work layer 86 is rectangular, and the four corners thereof are respectively connected with four electrode wires 89 for inputting a high-frequency current. The isolation layer 87 is made of the insulating material such as glass and covers on the first work layer 86. The second work layer 88 is made of a transparent conductive material and formed on the isolation layer 87. When the second work layer 88 is touched by a finger, a coupling capacitor is formed between the user and a surface of the touch screen due to the human electric field, wherein the coupling capacitor is a direct conductor for the high-frequency current, so that a small electric current is absorbed from the touch point by the finger. The current respectively flows out of the four electrode wires 89 at the four corners of the touch screen. The currents which flow through the four electrode wires 89 are in proportion to the distance from the finger to the four corners, so that the position of the touch point can be obtained by precisely calculating the ratio of the four currents. The above electrode wires also may be a wire array consisting of a plurality of wires which are perpendicular to each other.

In addition, the above capacitance type touch screen structure also may be formed between the upper polarizer 30 and the first base substrate, thereby avoiding the damage to the capacitance type touch screen structure due to the changes of temperature and humidity.

Example 6

The LCD device provided by Example 6 of the present invention comprises the LC panel of any one of the examples of the present invention, a frame and a controller outside or inside of the frame. The LC panel includes a first substrate and a second substrate facing each other, and a liquid crystal layer filled between the first substrate and the second substrate. The LC panel is embedded and fixed in the frame. Other accessories such as a backlight module, IC and the like can be provided in the frame. The touch type input structure and the electromagnetic type antenna array are connected with the controller to transmit a touch signal and an electromagnetic signal to the controller, wherein the controller is used for identifying the received touch signal and electromagnetic signal, transmitting an identified result to a control system of the LCD device, and displaying a corresponding image or page on the LC panel.

Figure 13:
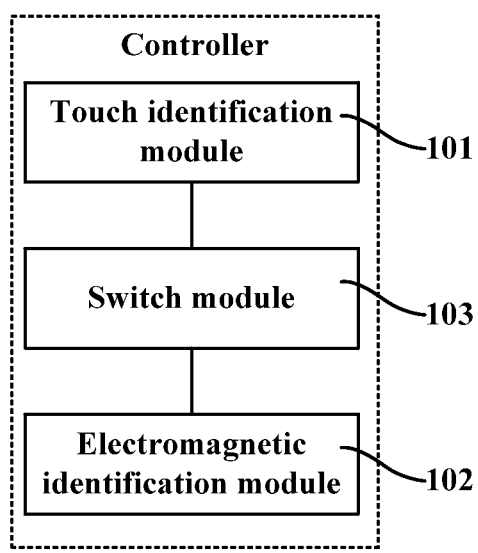
FIG. 13 is a block diagram of a controller in an LCD device provided by Example 6 of the present invention.

FIG. 13 is a block diagram of a controller in an LCD device provided by Example 6 of the present invention. The controller can comprise a touch identification module 101, an electromagnetic identification module 102 and a switch module 103. The touch identification module 101 is connected with the touch type input structure, specifically connected with the detection wires, to receive and identity the touch signal; the electromagnetic identification module 102 is connected with the antenna array to receive and identity the electromagnetic signal; and the switch module 103 is respectively connected with the electromagnetic identification module 102 and the touch identification module 101 to turn off the touch identification module 101 or turn off the connection between the touch type input structure and the touch identification module 101 when the electromagnetic signal is received.

By adopting the above solution, the touch identification module 101 is disable to receive and identify the touch signal when the controller can detect the electromagnetic signal sent by the electromagnetic induction pen, and it is able to receive and identify the touch signal when no electromagnetic signal is input, so that the collision of two input modes can be avoided, and the touching misoperation of the other articles can be avoided during the electromagnetic induction pen is used.

The LCD device of the present invention has the functions of the touch type handwritten input and the electromagnetic induction identification handwritten input to enrich the input modes of the users. The touch type input structure and the antenna array are respectively integrated on the polarizer and in the LC panel, so that the thickness of the LCD device can be hardly increased, thereby meeting the light and thin requirements and reducing the assembly cost. Furthermore, the touch type input structure and the antenna array are integrated in the LCD device, thus increasing the identification accuracy and reliability.

Finally, it should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the present invention.

What is claimed is:

1. A liquid crystal (LC) panel, comprising a first substrate and a second substrate facing each other, and a liquid crystal layer filled between the first substrate and the second substrate; the first substrate and the second substrate respectively comprise a first base substrate, a second base substrate and two multi-film structures respectively formed on the first base substrate and the second base substrate, and one side of the first substrate orientated away from the second substrate is adhered with a polarizer, wherein the LC panel further comprises:
   a touch type input structure, which is adhered on the outer surface of the polarizer orientated away from the first substrate to identify a touch signal; and
   an electromagnetic type antenna array, which comprises a first-direction conductive wire and a second-direction conductive wire, wherein the first-direction conductive wire and the second-direction conductive wire are respectively made of conductive material, formed on any one film between the first base substrate and the second base substrate, insulated from the conductive material in the multi-film structures and used for identifying an electromagnetic signal.

2. The LC panel according to claim 1, wherein the touch type input structure is a resistance type touch screen structure or a capacitance type touch screen structure.

3. The LC panel according to claim 2, wherein the resistance type touch screen structure comprises:
   a first conductive layer, which is made of a transparent conductive material and formed on the polarizer;
   a second conductive layer, which is made of a transparent material, formed on a transparent elastic substrate and faced to the first conductive layer, wherein a plurality of supports are formed between the first conductive layer and the second conductive layer; and
   a plurality of detection wires, which are respectively connected with the first conductive layer and the second conductive layer to input a bias voltage and receive a detection voltage value which changes according to the touch signal.

4. The LC panel according to claim 3, wherein
   the detection wires comprise two or four first-direction conductive bars and two or four second-direction conductive bars correspondingly;
   the first-direction conductive bars are arranged on the first conductive layer and respectively adjacent to side edges of the first conductive layer;
   the second-direction conductive bars are arranged on the second conductive layer and respectively adjacent to side edges of the second conductive layer; and
   the first-direction conductive bars and the second-direction conductive bars are used for alternately inputting the bias voltage and alternately receiving the detection voltage value.

5. The LC panel according to claim 3, wherein
the detection wires comprise a voltage detection wire and four or six voltage input wires, wherein the voltage input wires are connected with the first conductive layer and respectively adjacent to four corners of the first conductive layer in rectangular shape, and the voltage detection wire is connected with the second conductive layer; and
the voltage input wires are used for alternately inputting the bias voltage, and the voltage detection wire is used for receiving the detection voltage value.

6. The LC panel according to claim 2, wherein the capacitance type touch screen structure comprises:
a first work layer, which is made of a transparent conductive material and formed on the polarizer, wherein four corners of the first work layer in rectangular shape are respectively connected with electrode wires;
an isolation layer, which is made of an insulating material and cover on the first work layer; and
a second work layer, which is made of a transparent conductive material and formed on the isolation layer.

7. The LC panel according to claim 1, wherein
the multi-film structure on the first substrate, starting from one side adjacent to the first base substrate, comprises a color resin and black matrix layer, a first protection layer, a common electrode layer and a first alignment film in sequence; and
the multi-film structure on the second substrate, starting from one side adjacent to the second base substrate, comprises a thin-film transistor driving array film, a second protection layer and a second alignment film in sequence.

8. The LC panel according to claim 1, wherein
the first-direction conductive wire and the second-direction conductive wire are respectively formed at different positions between the base substrate and a film which are made of insulating material and adjacent to each other or two films which are made of insulating material and adjacent to each other in the LC panel.

9. The LC panel according to claim 7, wherein
the first-direction conductive wire and the second-direction conductive wire are respectively formed at different positions between the base substrate and a film which are made of insulating material and adjacent to each other or two films which are made of insulating material and adjacent to each other in the LC panel.

10. The LC panel according to claim 1, wherein
the first-direction conductive wire and the second-direction conductive wire are formed at a same position between the base substrate and a film which are made of insulating material and adjacent to each other or two films which are made of insulating material and adjacent to each other in the LC panel, and an internal interval insulating layer is formed between the first-direction conductive wire and the second-direction conductive wire.

11. The LC panel according to claim 7, wherein
the first-direction conductive wire and the second-direction conductive wire are formed at a same position between the base substrate and a film which are made of insulating material and adjacent to each other or two films which are made of insulating material and adjacent to each other in the LC panel, and an internal interval insulating layer is formed between the first-direction conductive wire and the second-direction conductive wire.

12. The LC panel according to claim 1, wherein
the first-direction conductive wire and/or the second-direction conductive wire are/is adjacent to a film of insulating material in the LC panel, and an outer interval insulating layer is formed between the first-direction conductive wire and/or the second-direction conductive wire and the adjacent film of the conductive material.

13. The LC panel according to claim 7, wherein
the first-direction conductive wire and/or the second-direction conductive wire are/is adjacent to a film of insulating material in the LC panel, and an outer interval insulating layer is formed between the first-direction conductive wire and/or the second-direction conductive wire and the adjacent film of the conductive material.

14. The LC panel according to claim 1, wherein
the antenna array is made of a transparent conductive material.

15. The LC panel according to claim 7, wherein
the antenna array is made of a transparent conductive material.

16. A liquid crystal display (LCD) device comprising the LC panel of claim 1, also comprising a frame and a controller outside or inside of the frame, wherein the LC panel is embedded in the frame; the touch type input structure and the electromagnetic type antenna array are connected with the controller to transmit the touch signal and the electromagnetic signal to the controller, and the touch signal and the electromagnetic signal are identified by the controller.

17. The LCD device according to claim 16, wherein the controller comprises:
a touch identification module, which is connected with the touch type input structure to receive and identity the touch signal;
an electromagnetic identification module, which is connected with the antenna array to receive and identity the electromagnetic signal; and
a switch module, which is respectively connected with the electromagnetic identification module and the touch identification module to turn off the touch identification module or turn off the connection between the touch type input structure and the touch identification module when the electromagnetic signal is received.

\* \* \* \* \*